United States Patent [19]

Maurice et al.

[11] Patent Number: 5,796,710
[45] Date of Patent: Aug. 18, 1998

[54] INFORMATION RECORDING MEDIUM ENCODED TO ENABLE TRACK FOLLOWING AND METHOD OF RECORDING

[75] Inventors: François Maurice, Verrieres le Buisson; Joseph Colineau, Bures S/Yvette; Charaf Hanna, Strasbourg; Michel Sonrier, Bois d'Arcy, all of France

[73] Assignees: Thomson-CSF, Paris; Thomson Consumer Electronics, Courbevoie, both of France

[21] Appl. No.: 813,119

[22] Filed: Mar. 7, 1997

Related U.S. Application Data

[62] Division of Ser. No. 256,907, Aug. 9, 1994, Pat. No. 5,640,285.

[30] Foreign Application Priority Data

Dec. 22, 1992 [FR] France ............... 92 15473

[51] Int. Cl.⁶ ....................................... G11B 7/24
[52] U.S. Cl. ........................ 369/275.3; 369/275.4
[58] Field of Search .................. 369/275.3, 275.4, 369/13, 46, 15, 50, 58, 59, 48, 124, 116; 360/46, 113, 63, 124

[56] References Cited

U.S. PATENT DOCUMENTS

| | | |
|---|---|---|
| 4,714,971 | 12/1987 | Sigiki et al. ............ 360/77.15 |
| 4,755,893 | 7/1988 | Yamada et al. ............ 360/77.15 |
| 4,843,493 | 6/1989 | Furuhata et al. ............ 360/77.15 |
| 5,282,104 | 1/1994 | Coutellier et al. ............ 360/115 |
| 5,335,120 | 8/1994 | Colineau et al. ............ 360/63 |
| 5,459,619 | 10/1995 | Colineau et al. ............ 360/47 |

FOREIGN PATENT DOCUMENTS

| | | |
|---|---|---|
| 0229732 | 7/1987 | European Pat. Off. . |
| 59-100678 | 6/1984 | Japan . |
| 61-287059 | 12/1986 | Japan . |
| WO 94/15335 | 7/1994 | WIPO . |

*Primary Examiner*—Ali Neyzari
*Attorney, Agent, or Firm*—Oblon, Spivak, McClelland, Maier & Neustadt, P.C.

[57] ABSTRACT

System for recording/writing on a recording medium in which there are distributed, on the tracks, groups (G0) of tracks with positive continuous components and groups (G1) of tracks with negative continuous components. In reading, the values of the different signals are integrated for each track. Then, on the one hand, a first addition circuit S1 adds up the results of integration of the first tracks of each group of tracks and, secondly, a second addition circuit S2 adds up the results of integration of the last tracks of each group of tracks. A comparison circuit (CD) compares the results of additions of the two addition circuits to correct the track-following operation.

14 Claims, 7 Drawing Sheets

INFORMATION RECORDING MEDIUM ENCODED TO ENABLE TRACK FOLLOWING AND METHOD OF RECORDING

This is a Division of application Ser. No. 08/256,907 filed on Aug. 9, 1994, now U.S. Pat. No. 5,640,285 which was filed as 371 Application of PCT/FR93/01278 filed on Dec. 21, 1993.

BACKGROUND OF THE INVENTION

1. Field of the Invention

The invention relates to an information recording medium, a recorder, a reader and a reading method. It can be applied notably to magnetic or optical media wherein the information elements are arranged in the form of parallel tracks. It relates more particularly to a track-following system.

The invention can be applied notably to computer peripheral recording and reading systems and to all systems of a professional type.

In particular, the invention provides solutions for track following and for the elimination of cross-talk in fixed-head reading systems.

DISCUSSION OF BACKGROUND

Present-day systems have low track density (with a pitch of over 100 μm). The tracks are separated by blank signal barriers to prevent reading cross-talk. This is ensured by heads that are less wide than the tracks. The checking of the position of the edge of the tape is enough to ensure efficient following of the track and interoperational quality of the tapes and readers for the tracks are wide.

Fixed-head systems cannot therefore hope to have high track density.

In digital information recording systems, each information element is constituted by positive (or zero) elements and negative elements. In the different tracks, the number of positive and negative elements is different. This gives rise to a non-zero continuous component.

To prevent this, a channel encoder that carries out a transcoding is used: a certain number of incoming bits will be encoded in the form of a higher number of magnetic domains, leaving sufficient freedom to eliminate the continuous component. Use will be made, for example, of the 8–10 code in which an 8-bit information element is encoded by means of 10 bits. This means that the 256 information elements possible with an 8-bit code use only 256 bits out of 1024 of a 10-bit code.

If values of +1 or −1 are assigned to the magnetic domains according to their direction, DSV designates the integral of these values on a track. Certain 10-bit recording codes therefore make it possible to limit the variations of the DSV around the zero value.

The invention modifies this encoding of information elements so as to enable a track-following system.

SUMMARY OF THE INVENTION

The invention therefore relates to an information recording medium in which the information elements are recorded in tracks located side by side, in which on each track the information elements are encoded, characterized in that the encoding of the first identified tracks is done so that these tracks have a continuous component with a first type of value while the encoding of the second tracks of the recording medium is done so that these second tracks have a continuous component with a second type of value.

The invention also relates to an information recorder positioned on an information medium along tracks located side by side wherein, on each track, the information elements are encoded, characterized in that the encoding of the first identified tracks is done so that these tracks have a continuous component with a first type of value while the encoding of the second tracks of the recording medium is done so that these second tracks have a continuous component with a second type of value.

The invention also relates to a reader of information elements recorded in tracks located side by side on a recording medium, characterized in that:

an integrated circuit integrates the values of the different signals for each track;

a first addition circuit S1 adds the integration results of the first tracks of each packet of tracks;

a second addition circuit S2 adds the integration results of the last tracks of each packet of tracks;

a comparison circuit compares the results of the additions of the two addition circuits.

Finally, the invention relates to a method of recording and reading information elements positioned on a recording medium in tracks located side by side wherein, on each track, the information elements are encoded, characterized in that the encoding of the first identified tracks is done so that these tracks have a continuous component with a first type of value while the encoding of the second tracks of the recording medium is done so that these second tracks have a continuous component with a second type of value.

BRIEF DESCRIPTION OF THE DRAWINGS

The different objects and characteristics of the invention can appear more clearly from the following description and from the appended figures, of which.

DETAILED DESCRIPTION OF THE PREFERRED EMBODIMENTS

Figure 1:
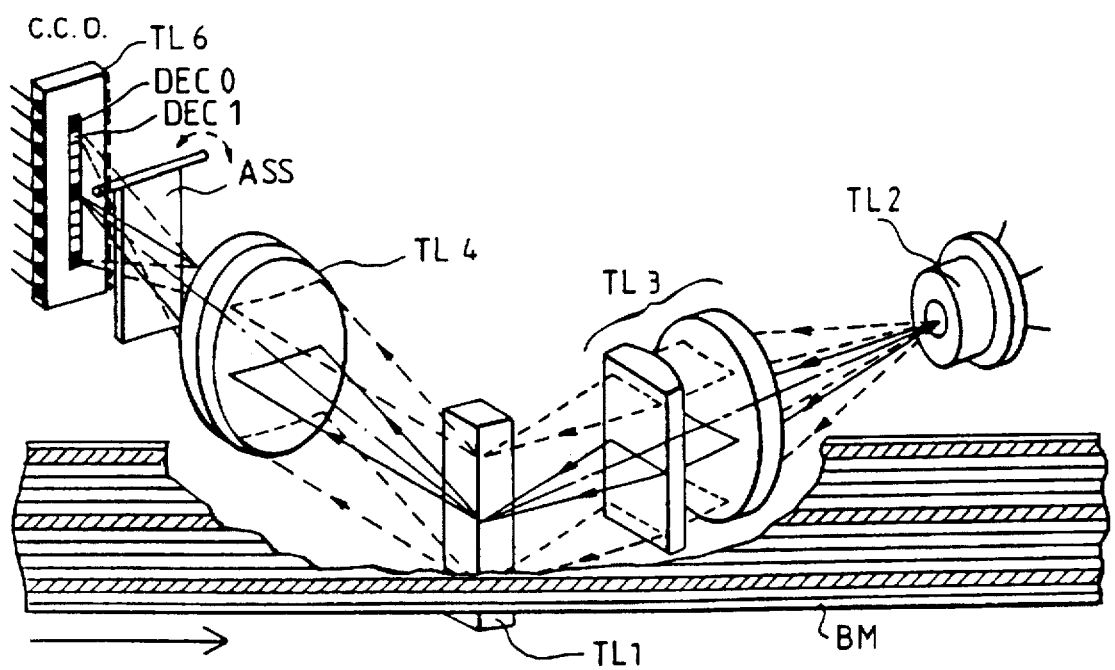
FIG. 1 shows a method for the magneto-optical reading of a magnetic recording tape.

The invention can now be described by using, for example, a 8/10 binary encoding with non-resetting in which a binary element 1 is represented by a change in state of the recording and a binary element 0 is represented by an absence of the change in state of the recording.

A code such as this is designated by: 8/10+NRZI (d,k) in which:

d: represents the minimum number of 0 bits between two 1 bits (for example d=0)

k=represents the maximum number of 0 bits between two 1 bits (for example k=3).

According to an appropriate encoding, it is possible to eliminate the continuous component and have, on each track, a DSV (Digital Sum value) that is limited and has an average zero value. To this end, for an 8-bit word giving 256 possible values, during the transcoding in 10 bits, 153 code-words are chosen in the 10-bit words, these 153 code-words possessing a zero continuous component DC=0 (number of bits at 1 equals number of bits at 0) complemented by 103 code words DC=+2 paired with 103 code words DC=−2. The latter differ only by the most significant bit and are used in an encoding strategy such that:

if a word DC=+2 has appeared, then the next word that arises will be chosen such that DC=−2 so as to make the DSV zero on an average. In view of the initialization which consists in initially choosing the code words in a table where DC=0 or +2, the direction of compensation will be such that a code word DC=−2 compensates for a code word DC=+2.

The track-following system makes profitable use of the existence of non-zero continuous component code words DC=+/−2. The idea is to make the DSV of each track increasing or decreasing in an average way according to a predefined scheme for all the tracks and to thus create an absolute track reference if it is possible, during the reading, to distinguish the tracks with increasing DSV and those with decreasing DSV.

This gives rise to a modification called "deterioration" on the 8/10 encoding algorithm. It is possible to speak of "modulation of the DSV" to qualify an increasing or decreasing variation of this DSV.

In this algorithm presented by FIG. 1 (for one track):

T represents the order of deterioration. So long as T=0, the algorithm of the initial 8/10 encoder is recovered.

S defines the direction of the modulation as one with a mean value that is increasing if S>0 and decreasing if S<0.

dsv is a variable of the state of the system which indicates whether alteration is possible in the desired direction.

dsv is a binary value that switches over at each word.

The method used according to the invention to make an increasing DSV consists in not compensating for a code word DC=+2 by a code word DC=−2 and altering by therefore permitting two consecutive code words DC=+2. The method for a decreasing DSV consists in compensating twice for a code word DC=+2 by a code word DC=−2 and therefore permitting two code words with consecutive DC=−2. The alteration is made effective by reversing the variable Q' which defines the choice between a code word DC=+2 or DC=−2 (encoder 8–10).

Figure 2:
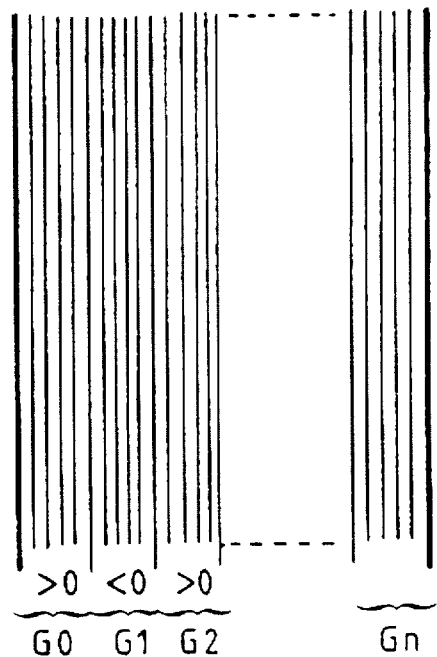
FIG. 2 exemplifies a recording medium such as a magnetic tape recorded according to the invention.

As shown in FIG. 2, provision is made for distributing the tracks of the magnetic medium into groups (G0, G1, G2, . . . , Gn). For example, groups of five tracks are provided for.

The tracks of the even-order groups are encoded so that each one has a positive continuous component. The tracks of the odd-order groups are encoded so that each one has a negative continuous component.

The tracks of one group can therefore be differentiated from the tracks of the neighboring groups.

At reading, the system enables the detection of the groups whose lines have positive continuous components from those whose lines have negative continuous components.

For the clarity of the explanation, all that will be considered will be the tracks located on either side of the boundaries defined as being the passage from a track with positive continuous component to a track with negative continuous component and vice versa.

Figure 3:
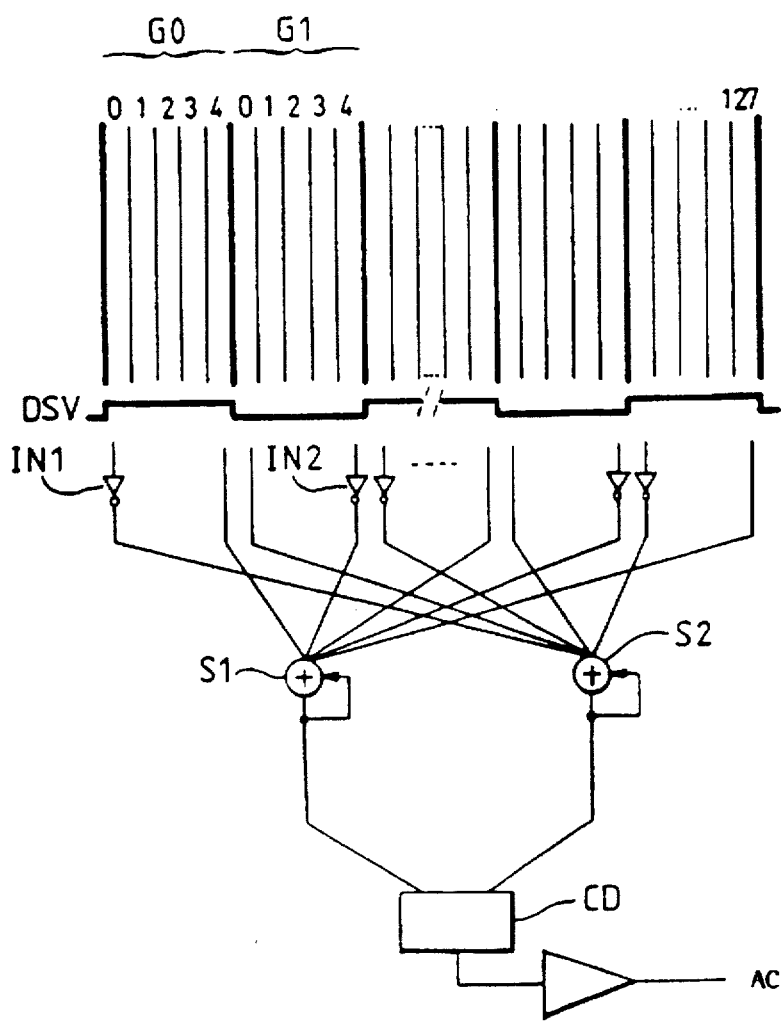
FIG. 3 shows a system for reading a magnetic tape recorded according to the invention.

FIG. 3 shows an exemplary embodiment of a circuit for the detection of alignment of read heads on the recorded tracks.

A digital or analog type adder computes the sum of the DSV values of the pre-boundary tracks such as the tracks 0 of the groups G0, G1, . . . . . Another adder S2 takes the sum of the DSV values of the post-boundary tracks such as the tracks 4 of the groups G0, G1, . . . .

Inverters such as IN1 invert the reading of the post-boundary tracks of the even-order groups and the inverters such as IN2 invert the reading of the preboundary tracks of the odd-order groups.

The summator S1 gives a detection signal when it detects a positive continuous component on the preboundary tracks of the even-order groups and a negative continuous component on the pre-boundary tracks of the odd-order groups. Similarly, the summator S2 gives a detection signal when it detects a positive continuous component on the post-boundary tracks of the even-order groups and a negative continuous component on the post-boundary tracks of the odd-order groups.

When the two summators S1 and S2 give an identical detection signal, the reading system is appropriately secured to the tracks to be read.

When the adder S1 gives a detection signal higher than that of the adder S2, it means that the reading system is offset by at least one track in one direction (towards the left in FIG. 3).

Figure 4:
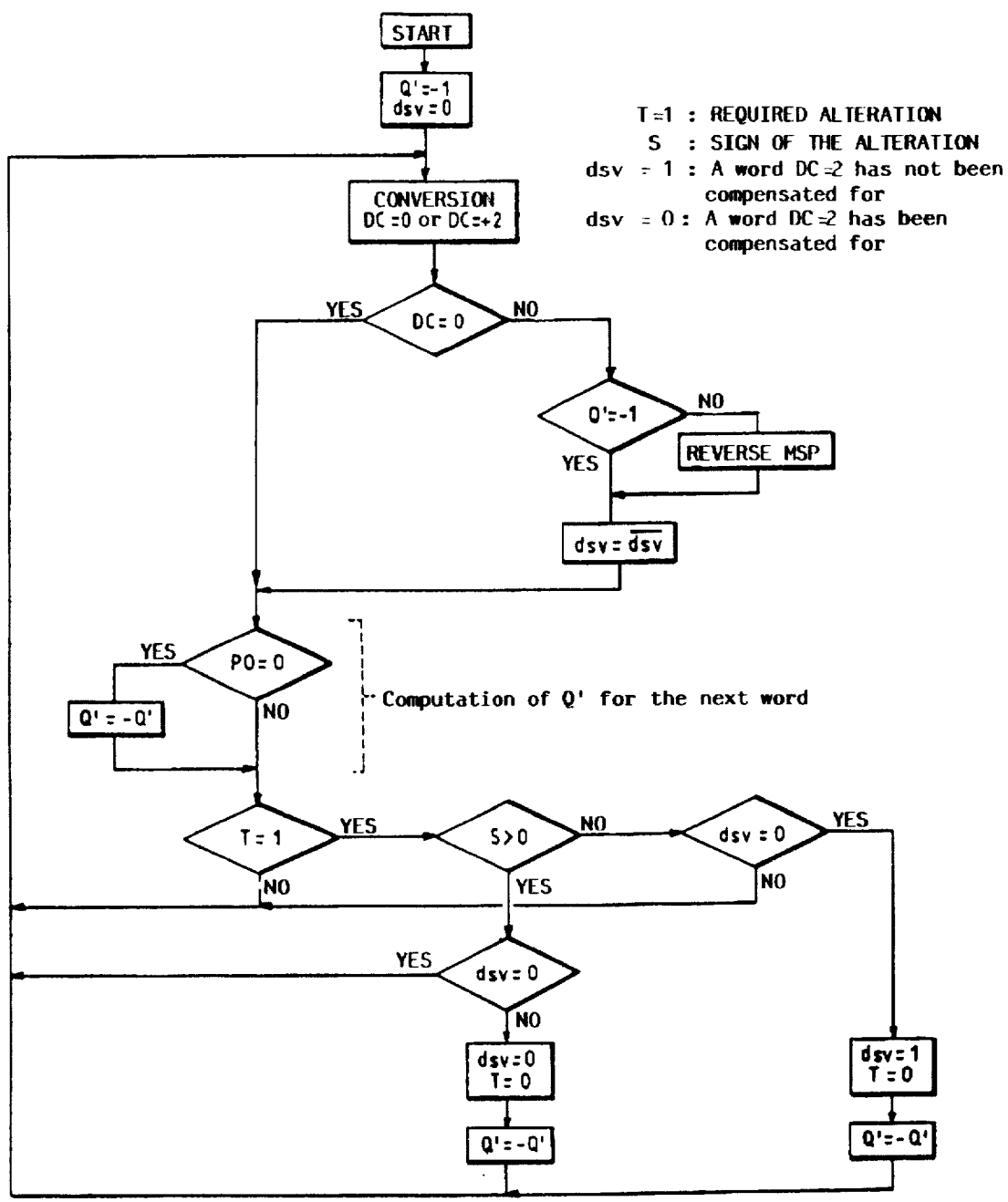
FIG. 4 shows a flow chart of a system according to the invention.

A circuit CD detects the direction of offset and gives a track-following correction signal. This track-following correction signal acts on a following device such as the one shown in FIGS. 4a and 4b.

The circuit of FIG. 3 provides for processing the DSV values of the pre-boundary and post-boundary tracks. However, without departing from the framework of the invention, it is also possible to provide for the processing of a greater number of tracks.

In FIG. 3, by way of an illustration, an operation in parallel has been shown. In fact, it is possible to carry out a cyclical exploration of the tracks. This explains the presence of the memories D1 and D2 which loop the output of each adder to its input. With these memories, it is possible to add the DSV values of the different tracks progressively.

This system has a certain degree of immunity to noise. The term noise pertains chiefly to tracks that are temporarily bad which, in the most optimum instances, would give a sequence of random samples defining a noise with an average value of zero and a standard deviation in N where N is the number of samples. Experience shows that this "ideal" case is very improbable and that a poor track, if it takes part in the track following operation, tends to greatly push the previously calculated DSV in one direction or the other. A few poor tracks could make this computation uncertain and highly noise infested.

To obtain immunity against this noise, all that is taken into account by the counters are the samples declared to be "not in erasure" i.e. above a certain threshold of amplitude, and the number of bits of the integrator is adapted accordingly.

FIG. 1 gives a schematic view of a system for the magneto-optical reading of a magnetic tape.

A magneto-optical reading device (TL1) as described in the French patent application No. 89 17313 is placed close to a magnetic support BM (magnetic tape). It receives a beam of polarized light from a transmitter TL2 and sends back to a detector TL6 a beam whose direction of polarization is a function of the state of magnetization of the tape.

A track-following system ASS is used to orient the light beam transmitted by the magneto-optical read device TL1 so that the different beams for the reading of the different tracks of the tape are accurately pointed towards the appropriate elementary detectors Dec0, Dec1. This track-following system ASS is controlled by the track-following system mentioned here above.

Figure 5:
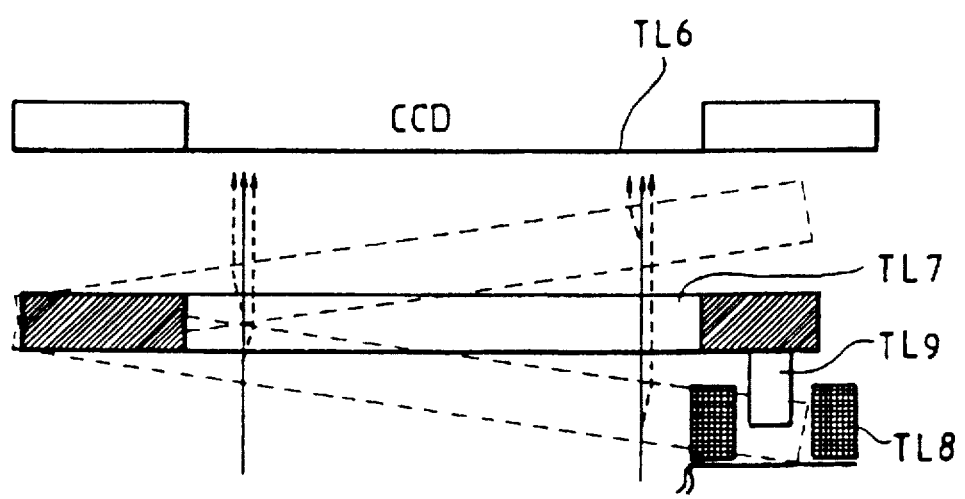
FIG. 5 shows a track-following system according to the invention.

The track-following system ASS can be made as shown in FIG. 5.

It has a glass plate with a parallel face TL7 positioned substantially in parallel to the detector TL6.

It has an electromagnet TL8 and a solenoid plunger TL9 fixedly joined to the plate TL7. The electromagnet receives electrical information elements pertaining to track following and enables the plate to be oriented so as to appropriately deflect the beam coming from the transducer TL1 towards the detector TL6 and assign a track-reading beam transmitted by the transducer TL1 to each photodiode of the detector TL6.

The system of control by electromagnet system may be replaced by a piezoelectric control system shifting either an optical element of the imaging system or the photoelement-based sensor.

Furthermore, it is not enough for the following system to be oriented so that the track-reading beams transmitted by the device M0 are oriented towards the detectors Dec0, Dec1, . . . . It is still necessary for each of these different beams to be centered as far as possible on a detector or at least positioned in a known way on a detector.

Indeed, owing to the number of tracks recorded on the magnetic medium, these tracks are very close to one another. During reading, there may therefore exist a cross-talk, and the reading of each track could be noise-infested by the neighboring tracks.

FIGS. 6a to 6e and 7a to 7b show a system that can be used to make the track-following system more precise by detecting possible cross-talk among the tracks and, for this purpose, by balancing the cross-talk of the different tracks with respect to one another. This system consists of a set of operators working sequentially on signal samples Xj coming from n neighboring tracks.

Figure 6A:
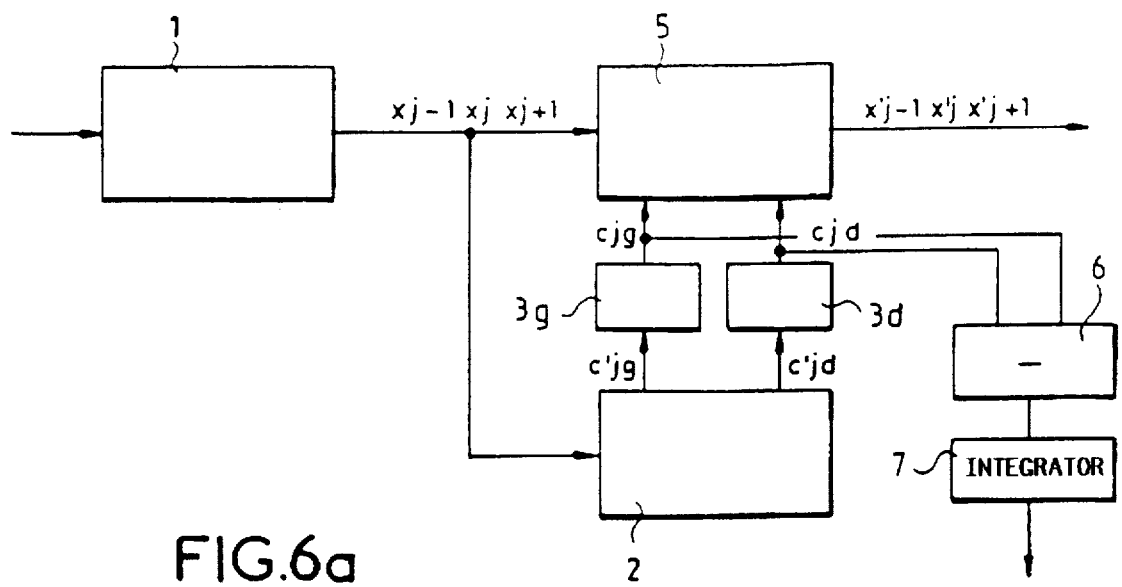
FIGS. 6a to 6e show a cross-talk correction system according to the invention.

Referring to FIG. 6a, a description shall now be given of a cross-talk correction system according to the invention. According to the reading system of FIG. 1, the read head enables simultaneous knowledge of the samples of all the tracks (contrary to rotating head systems where the precision of a passage from one head to the next one is insufficient). According to this simplified example, it is assumed that the samples of information elements coming from adjacent tracks are processed simultaneously.

The information elements coming from the j−1, j and j+1 order tracks will be considered to find out the cross-talk undergone by the track j owing to the tracks j−1 and j+1.

The different information elements read on the tracks of the recording medium are received by an amplitude control circuit 1 whose role shall be indicated here below. The different signals xj−1, xj, xj+1 are transmitted to a cross-talk estimation circuit 2 and to a cross-talk correction circuit 5.

The cross-talk estimation circuit 2 estimates the cross-talk that may exist from the track j−1 to the track j and from the track j+1 to the track 1. The estimation of a cross-talk coefficient C'jg (cross-talk of the track j−1 on the track) is done by computing the product of the value of the signal xj by unity assigned the sign of the signal xj−1. It will be said more simply hereinafter that the signal xj is multiplied by the signal of the signal xj−1. Similarly, the estimation of the cross-talk coefficient C'jd (cross-talk of j+1 on j) is done by multiplying the value of the signal xj by the sign of the signal xj+1.

Figure 6B:
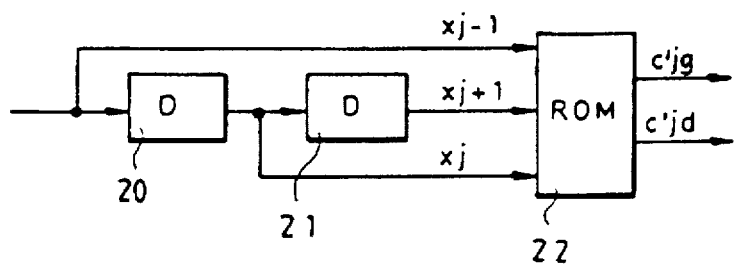

FIG. 6b gives an example of a cross-talk estimation circuit wherein the signals xj−1, xj, xj+1 arrive in series. Delay circuits 20, 21 carry out a phase resetting of the signals and a circuit 22, for example of the ROM memory type, computes the coefficients of cross-talk C'jg and C'jd.

Each cross-talk coefficient C'jg and C'jd thus computed is transmitted to a filter 3g, 3d or smoothing filter which enables the computing of the mean Cjg or Cjd in the course of time. For this purpose, each coefficient is combined with the previous cross-talk coefficient previously computed for the same track.

Figure 6C:
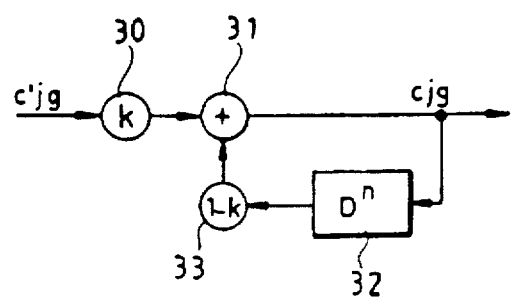

FIG. 6c exemplifies a smoothing filter. This filter is explained, for example, in relation with the cross-talk coefficient C'jg. A multiplier circuit 30 multiplies the coefficient C'jg received by a weighting coefficient k, this coefficient k being smaller than 1. The result is transmitted to an adder 31 which receives, at a second input, the cross-talk coefficient previously computed for the same track that had been kept in the memory 32 and is multiplied by the coefficient 1−k (multiplier circuit 33). Thus, there is obtained, at output, a cross-talk coefficient Cjg which is filtered.

Figure 6D:
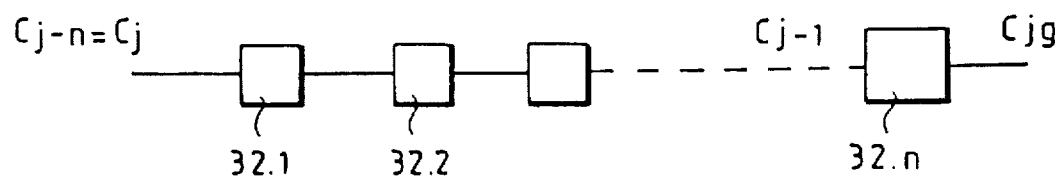

FIG. 6d gives the constitution, by way of an example, of the memory circuit 32. This memory circuit has n memory circuits 32.1 to 32.n. The number n is the number of tracks of the recording medium. Thus, at each processing of a track, the cross-talk coefficients previously computed for the other tracks are shifted by one memory step in such a way that the coefficient Cjg of a track computed at a given instant enters the memory (right-hand side) and is present in the circuits 33 and 31, n memory steps further below, when the circuit 31 receives the following coefficient C'jg of the same track.

The cross-talk coefficients Cjg and Cjd thus filtered are transmitted to the cross-talk correction circuit 5. This circuit also receives the signals xj−1, xj and xj+1 and corrects the cross-talk of the signal xj by performing the following operation:

$$xj-(Cjg.xj-1+Cjd.xj+1)$$

Figure 6E:
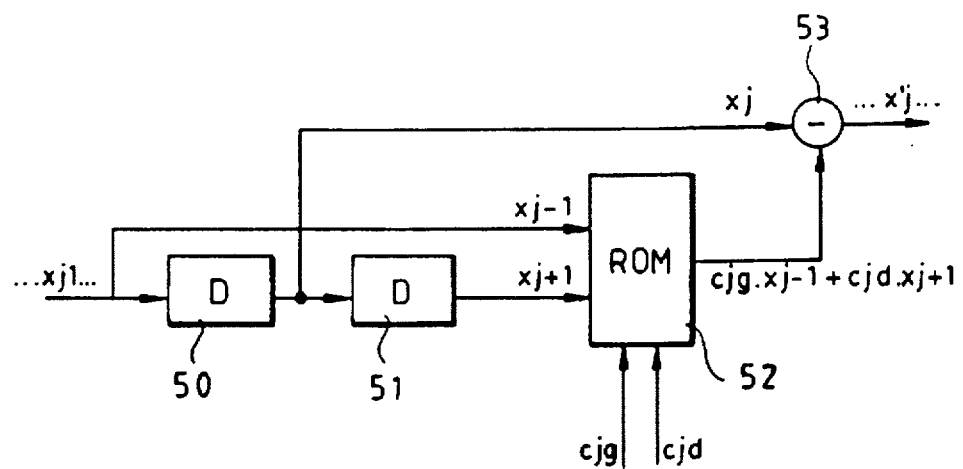

FIG. 6e exemplifies an embodiment of the cross-talk correction circuit 5. This circuit has two delay circuits 50, 51 that can be used to rephase the signals xj−1, xj, xj+1 which, it is assumed, are received in series. A ROM type circuit 52 receives the cross-talk coefficients Cjg and Cjd as well as the signals xj−1 and xj+1, and gives Cjg.xj−1+Cjd.xj+1 in exchange. This result is transmitted to the subtraction circuit 53 which computes the difference between this result and the value of the signal xj. Thus the cross-talk corrected signal x'j is obtained.

The circuit of FIG. 6a thus enable the correction of cross-talk of the signals xj.

This circuit also enables the computation of a track-following signal to control the track-following device TL5 described here above. This is achieved by means of a subtraction circuit 6 that is connected to the outputs of the filters 3g and 3d and computes the difference between the cross-talk coefficients. To prevent any sudden variation of the cross-talk coefficients from having an immediate effect on the track-following device, the difference Cjg−Cjd is integrated on the n tracks possessed by the recording medium. There is obtained a track-following signal whose average on all the tracks can be taken to give a result that is insensitive to phenomena affecting a particular track.

The different signals (xj) allowed into the circuit of FIG. 3a have, in principle, a value of −1 or +1. This is not so in reality. Under these conditions, any notable difference may distort the working of the circuit. This is why the amplitude control circuit mentioned here above is used to reduce the different signals (xj) to a value that is comparable, in terms of absolute value for all the tracks.

Figure 7A:
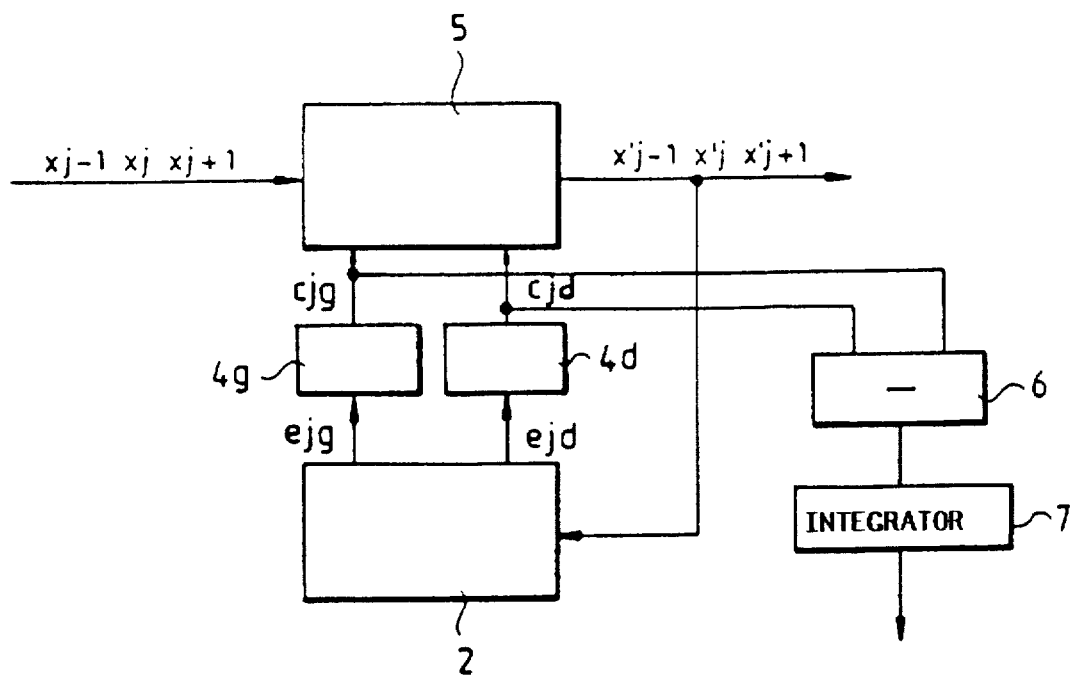
FIGS. 7a, 7b show a variant of the cross-talk correction system according to the invention.
Figure 7B:
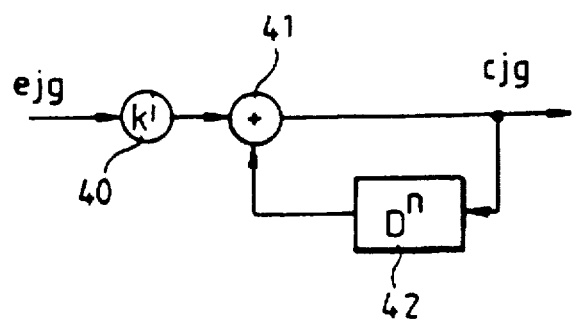

FIGS. 7a, 7b show a preferred alternative embodiment according to the invention.

FIG. 7a has a cross-talk correction circuit 5 which receives the signals xj−1, xj, xj+1.

The cross-talk estimation circuit 2 is connected to the output of the cross-talk correction circuit 5. It is associated with an integrating filter and therefore carries out an a posteriori computation of the cross-talk coefficients. In fact, since the cross-talk computation is done at output of the cross-talk correction circuit 5, the cross-talk estimation circuit carries out an estimation of residual cross-talk of a signal assumed to be already corrected for cross-talk. This circuit 2 works in the same way as that of FIG. 6a.

The estimated residual cross-talk coefficients ejg and ejd are transmitted to integrating filters 4g and 4d. These filters continually integrate the cross-talk coefficient.

The following is the operation carried out by the integrating filters:

$$Cjg_t = Cjg_{t-1} + k'e_{j_g}$$

i.e. at the instant t the new estimated value of the cross-talk coefficient is equal to the value at the instant t−1 corrected by a fraction k' of the residual error $e_{j_g}$.

This is an adaptive process according to the gradient algorithm.

FIG. 7b shows an exemplary embodiment of these filters. A circuit 40 caries out a weighting, by means of a coefficient k' (smaller than $_1$), of the residual cross-talk coefficient (ejg). The weighted coefficient is transmitted to an input of an addition circuit 41 whose output is looped to another input by a memory circuit 42. This memory circuit 42 is constituted, for example, as shown in FIG. 6d. It can seen therefore that the residual cross-talk coefficient ejg, weighted by the coefficient k', is added to the value of the cross-talk coefficient previously computed for the same track.

The circuits 4g and 4d then transmit cross-talk coefficients Cjg and Cjd to the cross-talk correction circuit 5 which is constituted in the same way as that of FIGS. 6a and 6e and works in the same way.

The circuit of FIG. 7a therefore gives signals corrected for cross-talk x'j.

Like the circuit of FIG. 6a, that of FIG. 7a has circuits 6 and 7 which, starting from the cross-talk coefficients Cjg and Cjd, give a track-following signal.

It may be recalled that the processing of the track signals that has just been descried can be done sequentially for the different tracks.

An a posteriori estimator of residual cross-talk as described (circuits 1, 1') is therefore essentially the product of the current sample (Xj) by the sign of the disturbing sample (Xj+1) (synchronous detection). It can be seen therefore that the system can be used to correct cross-talk among tracks.

Furthermore, with regard to the following of tracks, given the values of precision of mechanical positioning that can be achieved, the boundaries of the zones with DSV>0 or <0 may be as close as 100 to 200 µm without creating any positioning ambiguity.

The large number of boundaries that can thus be detected makes the system robust in the presence of missing tracks.

It is important to note that the modification of the rules of management of the DSV in no way causes deterioration in the capacity of the channel.

The identification of a track according to the invention entails not the identification of a particular original track, which would make for a fragile system, but the detection of boundaries between small packets of tracks characterized by a common property.

The identification of tracks according to the invention is as simple as possible since it analyzes only one pre-boundary track and one post-boundary track. It is possible, by analyzing two tracks or more on each side of each boundary, to obtain the value of deviation at the boundary in terms of number of tracks and improve the dynamic performance of the system.

The invention therefore relates to a cross-talk correction and track-following system that does not cause any deterioration of the capacity of the multiple-track signal and tolerates defects (randomly erroneous tracks). No special marking track is needed.

In a more improved system, the reading may be done in parallel on three blocks of 128 tracks. It has been chosen, during writing, to make the DSVs of the tracks alternately increasing and decreasing modulo 5 tracks in a block of 128 tracks and to duplicate this pattern in the other two blocks of 128 tracks.

The track-following system which uses only one of these blocks at reading can therefore be conveyed from one block to the other without modification.

A variation modulo 5 enables, as it happens, the most efficient distribution of the increasing DSV/decreasing DSV and decreasing DSV/increasing DSV boundaries, thus minimizing the number of these transitions per selection line and per data line of the matrix head.

We claim:

1. Information recording medium in which the information elements are recorded in tracks located side by side, in which on each track the information elements are encoded, characterized in that the encoding of first identified tracks is done so that said first identified tracks have a continuous component with a first value while the encoding of second tracks of the recording medium is done so that said second tracks have a continuous component with a second value different from said first value wherein each one of said first identified tracks is in an alternating relationship with each one of said second tracks to form said side by side tracks.

2. Medium according to claim 1, characterized in that the encoding of the first identified tracks is done so that said first identified tracks have a positive continuous component while the encoding of the second tracks of the recording medium is done so that said second tracks have a negative continuous component.

3. Medium according to claim 1, characterized in that the first tracks are distributed in the form of packets of consecutive tracks.

4. Medium according to claim 3, characterized in that the encoding is a digital RLL encoding in which each of the digital positions with zero continuous components represents an information element and each digital position with a positive continuous component is paired with a digital position having a negative continuous component to represent an information element, this information element being thus represented, according to choice, by one of the two digital positions, the first tracks presenting digital positions with positive continuous components and the second tracks presenting digital positions with negative continuous components.

5. Medium according to claim 1, characterized in that it comprises a magnetic tape.

6. Medium according to claim 1, characterized in that it comprises a magnetic disk or an optical recording disk.

7. Information recorder positioned on an information medium along tracks located side by side wherein, on each track, the information elements are encoded, characterized in that the encoding of the first identified tracks is done so that said first identified tracks have a continuous component with a first value while the encoding of the second tracks of the recording medium is done so that said second tracks have a continuous component with a second value different from said first value wherein each one of said first identified tracks is in an alternating relationship with each one of said second tracks to form said side by side tracks.

8. Recorder according to claim 7, characterized in that the encoding of the first identified tracks is done so that said first identified tracks have a positive continuous component while the encoding of the second tracks of the recording medium is done so that said second tracks have a negative continuous component.

9. Recorder according to claim 7, characterized in that the first tracks are distributed in the form of packets of consecutive tracks.

10. Recorder according to claim 9, characterized in that the encoding is a digital RLL encoding in which each of the digital positions with zero continuous components represents an information element and each digital position with a positive continuous component is paired with a digital position having a negative continuous component to represent an information element, this information element being thus represented, according to choice, by one of the two digital positions, a circuit choosing, for the first tracks, the digital positions with positive continuous components and, for the second tracks, the digital positions with negative continuous components.

11. A method of recording and reading information elements positioned on a recording medium in tracks located side by side wherein, on each track, the information elements are encoded, characterized in that the encoding of first identified tracks is done so that said first identified tracks have a continuous component with a first value while the encoding of the second tracks of the recording medium is done so that said second tracks have a continuous component with a second value different from said first value wherein each one of said first identified tracks is in an alternating relationship with each one of said second tracks to form said side by side tracks.

12. Method according to claim 11, characterized in that the encoding of the first identified tracks is done so that said first identified tracks have a positive continuous component while the encoding of the second tracks of the recording medium is done so that said second tracks have a negative continuous component.

13. Method according to claim 11, characterized in that the first tracks are distributed in the form of packets of consecutive tracks.

14. Method according to claim 13, characterized in that the encoding is a digital RLL encoding in which each of the digital positions with zero continuous components represents an information element and each digital position with a positive continuous component is paired with a digital position having a negative continuous component to represent an information element, this information element being thus represented, according to choice, by one of the two digital positions; and in that there are chosen, for the first tracks, the digital positions with positive continuous components and, for the second tracks, the digital positions with negative continuous components.

* * * * *